United States Patent
Pötschke et al.

(10) Patent No.: US 12,006,559 B2
(45) Date of Patent: Jun. 11, 2024

(54) HARDMETALS AND METHOD FOR PRODUCING THE SAME

(71) Applicant: FRAUNHOFER-GESELLSCHAFT ZUR FÖRDERUNG DER ANGEWANDTEN FORSCHUNG E.V., Munich (DE)

(72) Inventors: Johannes Pötschke, Dresden (DE); Mathias Herrmann, Coswig Sachsen (DE)

(73) Assignee: FRAUNHOFER-GESELLSCHAFT ZUR FÖRDERUNG DER ANGEWANDTEN FORSCHUNG E.V., Munich (DE)

( * ) Notice: Subject to any disclaimer, the term of this patent is extended or adjusted under 35 U.S.C. 154(b) by 63 days.

(21) Appl. No.: 17/767,496

(22) PCT Filed: Oct. 5, 2020

(86) PCT No.: PCT/EP2020/077837
§ 371 (c)(1),
(2) Date: Apr. 8, 2022

(87) PCT Pub. No.: WO2021/069370
PCT Pub. Date: Apr. 15, 2021

(65) Prior Publication Data
US 2023/0052721 A1    Feb. 16, 2023

(30) Foreign Application Priority Data

Oct. 11, 2019 (DE) .......... 10 2019 127 518.0

(51) Int. Cl.
| | |
|---|---|
| C22C 29/00 | (2006.01) |
| B22F 1/10 | (2022.01) |
| B33Y 70/10 | (2020.01) |
| C22C 1/053 | (2023.01) |
| C22C 29/02 | (2006.01) |
| C22C 29/04 | (2006.01) |
| C22C 29/06 | (2006.01) |
| C22C 29/12 | (2006.01) |
| C22C 29/16 | (2006.01) |

(52) U.S. Cl.
CPC ............ *C22C 29/005* (2013.01); *B33Y 70/10* (2020.01); *C22C 1/053* (2013.01); *C22C 29/02* (2013.01); *C22C 29/04* (2013.01); *C22C 29/06* (2013.01); *C22C 29/12* (2013.01); *C22C 29/16* (2013.01); *B22F 1/10* (2022.01)

(58) Field of Classification Search
CPC ....... C22C 29/005; C22C 1/053; C22C 29/06; C22C 29/02; C22C 29/04; C22C 29/12; C22C 29/16; B33Y 70/10; B33Y 10/00; B22F 1/10; B22F 3/10; B22F 3/045; B22F 3/15; B22F 10/25; B22F 2003/1052; B22F 2005/001; B22F 2998/10; Y02P 10/25

See application file for complete search history.

(56) References Cited

U.S. PATENT DOCUMENTS

2019/0024198 A1*   1/2019   Hong ................... C22C 30/02

FOREIGN PATENT DOCUMENTS

| CN | 107 245 626 | 10/2017 |
|---|---|---|
| CN | 109161773 | 1/2019 |
| CN | 110 078 512 | 8/2019 |
| WO | 2017/148885 | 9/2017 |

OTHER PUBLICATIONS

Zhou et al., "High-entropy carbide: A novel class of multicomponent ceramics", *Ceramics International*, Bd. 44, Nr. 17, XP055746589, ISSN: 0272-8842, pp. 22014-22018 (Dec. 1, 2018).
Wie et al., "High entropy carbide ceramics from different starting materials", *Journal of the European Ceramic Society*, Bd. 39, Nr. 10, XP055746594, ISSN: 0955-2219, Aug. 1, 2019, pp. 2989-2994.
Yan et al., "$Hf_{0.2} Zr_{0.2} Ta_{0.2} Nb_{0.2} Ti_{0.2}$) C high-entropy ceramics with low thermal conductivity", *Journal of the American Ceramic Society*, Bd. 101, Nr. 10, XP055746604, ISSN: 0002-7820, pp. 4486-4491 (May 28, 2018).
*Comprehensive Hard Materials*, vol. 1, ed. Sarin, Elsevier, ISBN: 9780080965284, pp. 30-49 (2014).
Kieffer R. et al., *Hartstoffe und Hartmetalle*, Wien, Springer-Verlag, pp. 196-205 (1953).
Harrington et al., "Phase stability and mechanical properties of novel high entropy transition metal carbides.", *Acta Materialia* 166, pp. 271-280 (2019).
Sarker et al., "High entropy high-hardness metal carbides discovered by entropy descriptors.", *Nature Communication* DOI: 10.1038/s41467-018-07160-7 HEC, ., pp. 1-10 (2018).

(Continued)

*Primary Examiner* — Adil A. Siddiqui
(74) *Attorney, Agent, or Firm* — GREENBLUM & BERNSTEIN, P.L.C.

(57) ABSTRACT

The invention concerns the field of hardmetal materials and relates to hardmetals such as those which can, for example, be used as cutting material for tools. The object of the present invention is to specify hardmetals which include a novel concept for the structural composition of the hardmetals. The object is attained with hardmetals which are at least made up of hard phases in particle form and metal binder arranged therebetween, wherein a high-entropy hard phase (HEH) is composed of at least four metals (Me) of the 4th and/or 5th and/or 6th subgroup of the PTE in the form of a solid solution of carbides, nitrides, carbonitrides, oxycarbides, and/or oxycarbonitrides of the metals, wherein the respective amounts of the metals in the HEH are essentially equal.

24 Claims, No Drawings

(56) References Cited

OTHER PUBLICATIONS

Lou et al., "Effects of binders on the microstructuresand mechanical properties of ultrafine WC-10%AlxCoCrCuFeNi composites by spark plasma sintering," *Journal of Alloys and Compounds*; DOI: 10.1016/j.jallcom.2019.03.328 (abstract).
Int'l Search Report (Form PCT/ISA/210) conducted in Int'l Appln. No. PCT/EP2020/077837 (Nov. 12, 2020).
Int'l Written Opinion (Form PCT/ISA/237) conducted in Int'l Appln. No. PCT/EP2020/077837 (Nov. 12, 2020).

\* cited by examiner

HARDMETALS AND METHOD FOR PRODUCING THE SAME

The invention is concerned with the fields of hardmetal materials and ceramic and/or powder-metallurgical process engineering and relates to hardmetals such as those which can, for example, be used as cutting material for tools such as lathe cutters, drill bits, and milling tools, and as wear-resistant dies, for example in forming or stamping tools, and to a method for the production thereof.

Hardmetals are metal matrix composites in which hard phases that are present as small particles are held together by a matrix of metal. As a result, hardmetals are somewhat less hard than the pure hard phases, but are considerably tougher. On the other hand, they are harder than pure metals, alloys, and hardened steel, but are more fragile (COMPREHENSIVE HARD MATERIALS, ISBN: 9780080965284).

All hardmetals invariably comprise metal-forming carbides (hard phase), and tungsten carbide/cobalt hardmetals (WC—Co) in particular are known as standard types, having the greatest importance in terms of quantity. In addition to WC they contain no or only slight amounts (<1.8 mass %) of other carbides, such as vanadium carbide (VC), chromium carbide ($Cr_2C_3$), titanium carbide (TiC), molybdenum carbide ($Mo_2C$), and tantalum niobium carbide ((Ta, Nb)C). Furthermore, there are also hardmetals with additional metal carbides of 5 up to 25 mass % which are above all characterized by an adapted thermal conductivity.

Particularly in Anglo-American usage, the term "cermet" denotes all types of hard phases. For this reason, the hardmetals, in particular tungsten carbide-free hardmetal cutting materials, also belong to the cermets, even though there are differences in the manufacturing process, in the mechanical characteristics, and in the interactions between the composite components. The ceramic hard phases of cermets are often titanium carbide (TiC) and titanium carbonitride (TiCN), while nickel, cobalt, iron, and others are used as metallic components. Furthermore, additional carbides such as molybdenum carbide ($Mo_2C$), tungsten carbide (WC), or chromium carbide ($Cr_3C_2$), for example, are often added in order to improve wetting during sintering and to improve the mechanical and also thermal properties.

The cermets are thereby mostly constructed in a nucleus/shell structure, wherein the nucleus is always made up, in a single phase, of a metal carbide, metal nitride, or metal carbonitride, and the shell also contains the additional precipitated carbides.

As an alternative to the metallic components nickel, cobalt, and iron indicated and used in many ways in the industry as metal binder, complex binder alloys, referred to as high-entropy alloys (HEA), have also been under development in recent times. (Lou: Journals of Alloys and Compounds; DOI: 10.1016/j.jallcom.2019.03.328). Special metallic binder alloys (high-entropy alloys (HEA)) of this type are not the subject of the present invention.

The production of hardmetal bodies, which in the green state contain the raw hardmetal powder in addition to organic binders, by means of pressing processes, extrusion, MIM/CIM, or 3D printing of green bodies and subsequent sintering is known from the prior art. Hardmetal component parts with a differing composition can thereby be produced.

Regarding the crystalline structure in the production of hardmetals, for example from WC—Co, in conventional production a hardmetal structure is ideally formed which is made up of WC grains in a cobalt-rich matrix with dissolved tungsten and carbon.

Hard phases and hardmetals have already been known for some time. According to Kiefer R., et al: Hartstoffe and Hartmetalle, Vienna, Springer-Verlag, 1953, p. 196ff, numerous carbide multi-component systems are known as hard phases, up to ternary and complex systems. "The alloy possibilities for hard carbides in triple systems and multi-systems are extraordinarily numerous." "In general, one can again distinguish between two groups of alloys which are of technical interest. The carbides of the 4th and 5th group can be combined. Because these carbides are all isotypic, full miscibility can also be expected in three-component and multi-component alloys, with the exception of systems containing high amounts of ZrC."

Various triple systems, such as titanium carbide-niobium carbide-tantalum carbide or tantalum carbide-molybdenum carbide-tungsten carbide, were examined, but also the quadruple systems titanium carbide-vanadium carbide-niobium carbide-molybdenum carbide and titanium carbide-vanadium carbide-molybdenum carbide-tungsten carbide.

Additional information about the properties of these systems or practical applications is not available.

Also known is the development of what are referred to as "high-entropy carbides" (HEC), which are a new class of multi-systems of ceramics (Zhou, J., et al: Ceram. Internat. 44 (2018) 22014-22018). The studies were conducted using HEC with equiatomic (Ti, Zr, Hf, Nb, Ta)C high-entropy carbide powder. The raw powders TiC, ZrC, HfC, NbC, TaC were used at an equimolar ratio and synthesized by means of pressure-assisted sintering technology (spark plasma sintering—SPS).

According to the results, at 1950° C. it was possible to obtain a pure, face-centered, cubic-structured solid solution in which metal atoms were situated in random orientation in the metallic sublattice. This led to the assertion that HEC powder is more thermally stable than the initial components thereof.

In addition, HECs with high hardness were theoretically predicted, and individual HECs then experimentally examined, by Sarker, P., et al: Nature Communication DOI: 10.1038/s41467-018-07160-7. In particular, the system (Mo, Nb, Ta, V, W)$C_5$ was more closely examined, and a high hardness was found.

According to Wie, X-F., et al: J. of the Europ. Ceram. Soc. 39 (2010), 2989-2994, HECs were likewise produced from different raw powders and examined. In this case, $(Ti_{0.2}Zr_{0.2}Nb_{0.2}Ta_{0.2}W_{0.2})C$ in particular was examined, which was likewise produced by means of SPS.

It was found that the particle size of the raw powders in particular is relevant to the homogeneous distribution of the individual elements in the HEC, whereas the relative density decreases where finer raw powders are used.

According to Harrington, T. J., et al: Acta Materialia 166 (2019) 271-280, the phase stability of the solid solution and the mechanical properties of HEC were examined. The studies were conducted using five-metal carbides of the metals of the IVB, VB, and VIB group of the PTE.

The materials examined showed an increased hardness.

A disadvantage of the known prior art concerning HECs is that the HECs have been extremely brittle up to now. The use thereof as hard phase in hardmetals and the properties thereof have, as of yet, neither been realized nor studied. Likewise, no production methods for manufacturing HEC-based hardmetals of this type are known.

The object of the present invention is to specify hardmetals which have further improved mechanical properties and include a novel concept for the structural composition of the hardmetals, and to specify a simple and cost-efficient method for the production of said hardmetals.

The object is attained by the invention disclosed in the claims. Advantageous embodiments are the subject of the dependent claims, wherein the invention also includes combinations of the individual dependent claims within the meaning of an AND-operation, provided that they are not mutually exclusive.

The hardmetals according to the invention are at least made up of hard phases in particle form and metal binder arranged therebetween, wherein a high-entropy hard phase (HEH), the content of which in the hardmetal according to the invention is at least 50 vol %, is composed of at least four metals (Me) of the 4th and/or 5th and/or 6th subgroup of the periodic table of elements (PTE) in the form of a solid solution of carbides, nitrides, carbonitrides, oxycarbides, and/or oxycarbonitrides of the metals, and wherein the respective amount x, y, and z in total of the carbon (C), nitrogen (N), and oxygen (O) in the carbides, nitrides, carbonitrides, oxycarbides, and/or oxycarbonitrides of the metals of the 4th and/or 5th and/or 6th subgroup of the PTE is in accordance with $MeC_xN_yO_z=0.7 \leq x+y+z \leq 1$, and wherein the respective amounts of the metals of the 4th and/or 5th and/or 6th subgroup of the PTE in the at least four metals in the HEH is essentially equal or the amount of one or more of said metals differs therefrom by maximally 20 at. %, and wherein the carbides, nitrides, carbonitrides, oxycarbides, and/or oxycarbonitrides of the metals of the 4th and/or 5th and/or 6th subgroup of the PTE are present in each hard phase particle as a solid solution, and furthermore maximally 50 vol % of the hard phases have a different hard phase composition, and wherein as metal binders all metal binders known for hardmetals are present in the amounts of 0.1 to 40 vol %, in relation to the hardmetal, known for hardmetals.

It is advantageous if 50-100 vol %, advantageously 60-99 vol %, more advantageously 80-98 vol % of the hard phases are an HEH of at least four metals of the 4th and/or 5th and/or 6th subgroup of the PTE in the form of a solid solution of carbides, nitrides, carbonitrides, oxycarbides, and/or oxycarbonitrides.

It is likewise advantageous if 0-50 vol %, advantageously 1 to 20 vol %, additional hard phase of the hard phases in the hardmetal are composed of one, two, or three metals of the 4th and/or 5th and/or 6th subgroup of the periodic table of elements (PTE) in the form of a solid solution of carbides, nitrides, carbonitrides, oxycarbides, and/or oxycarbonitrides of the metals.

It is furthermore advantageous if the hard phases are composed of carbides or nitrides of the metals of the 4th and/or 5th and/or 6th subgroup of the PTE.

And it is also advantageous if the respective amount x, y, and z in total of the carbon (C), nitrogen (N), and oxygen (O) in the carbides, nitrides, carbonitrides, oxycarbides, and/or oxycarbonitrides with metals of the 4th and/or 5th and/or 6th subgroup of the PTE is in accordance with $MeC_xN_yO_z=0.9 \leq x+y+z \leq 1$, advantageously with $MeC_xN_yO_z$ where x=0-1 and/or y=0-1 and/or z=0-0.2

It is also advantageous if the amounts of the metals are present according to the following:
HEH of a number of n metals of the 4th and/or 5th and/or 6th subgroup of the PTE with n=4 to 9, wherein
in the case of n=4 to 6 the amounts of the respective metals can differ according to $(1/n \cdot 100) \pm 10$ at. %, advantageously ±5 at. %, more advantageously ±2 at. %,
and/or
in the case of n=7 to 9 the amounts of the respective metals can differ according to $(1/n \cdot 100) \pm 5$ at. %, advantageously ±2 at. %,
and/or
the amounts of n−3 (n minus 3) of the metals can also differ by respective amounts of >10 at. %, in relation to the total metal content in the HEH, wherein the amount of one of the metals can maximally be 70 at. %, advantageously 60 at. %, in relation to the total metal content of the HEHs.

It is furthermore advantageous if each amount of a metal differs by maximally 20 at. % from the amount which results from the equal amounts for all metals with n metals.

It is likewise advantageous if the hard phase HEH is present such that it is composed of five, six, seven, or more metals of the 4th and/or 5th and/or 6th subgroup of the PTE in the form of a solid solution of carbides, nitrides, carbonitrides, oxycarbides, and/or oxycarbonitrides.

And it is also advantageous if, in the HEH of at least four metals of the 4th and/or 5th and/or 6th subgroup of the PTE in the form of a solid solution of carbides, nitrides, carbonitrides, and/or oxycarbonitrides, the amount of the at least four metals of the 4th and/or 5th and/or 6th subgroup of the PTE in the form of carbides, nitrides, carbonitrides, and/or oxycarbonitrides is each essentially equal.

It is also advantageous if Ti, V, Cr, Zr, Nb, Mo, Hf, Ta, W are present as metals of the hard phases.

And it is also advantageous if Co, Ni, Fe, Mn, Cu, Cr, Ti or mixtures thereof, such as low-carbon or high-carbon steels or high-entropy metal alloys, are present as metal binders.

It is furthermore advantageous if 5 to 32 vol % metal binder, in relation to the hardmetal, is contained in the hardmetals.

In the method for producing hardmetals according to the invention, powders from at least four metals of the 4th and/or 5th and/or 6th subgroup of the periodic table of elements (PTE) in the form of carbides, nitrides, carbonitrides, and/or oxycarbonitrides are mixed and synthesized into an HEH powder or into HEH granules, and maximally 50 vol % additional hard phase powders or hard phase granules are subsequently added to the HEH powders or the granules of the HEH, and these hard phases are mixed with metal binder in powder form in an amount of 0.1 to 40 vol %, in relation to the hardmetal, and sintered to form hardmetal powder or hardmetal granules and, after a shaping, component parts.

Advantageously, component parts are formed from the mixture with organic binders via a shaping process, the organic binders are removed, and the component parts are sintered.

It is furthermore advantageous if the shaping is realized by means of pressing, extruding, injection molding, CIP (cold isostatic pressing), and/or by means of additive shaping.

It is also advantageous if the sintering occurs in a pressure-free or pressure-assisted manner by means of sinter hot isostatic pressing, hot isostatic pressing (HIP), hot pressing, or SPS.

It is likewise advantageous if at least five or six or seven or more powders of metals of the 4th and/or 5th and/or 6th subgroup of the PTE in the form of carbides, nitrides, carbonitrides, and/or oxycarbonitrides are mixed and the mixture is synthesized with metal binders in situ during the sintering to form hardmetals containing HEH.

It is also advantageous if four powders of metals of the 4th and/or 5th and/or 6th subgroup of the PTE in the form of carbides and/or nitrides are mixed and the mixture is synthesized with metal binders in situ during the sintering to form hardmetals containing HEH.

It is furthermore advantageous if 0-<50 vol %, more advantageously 1 to 20 vol %, of powders from hard phases of one or two or three metals of the 4th and/or 5th and/or 6th subgroup of the PTE in the form of a solid solution of carbides, nitrides, carbonitrides, and/or oxycarbonitrides are used.

It is likewise advantageous if the synthesis of the HEH powders is carried out from the reduction of oxides from metals of the 4th and/or 5th and/or 6th subgroup of the PTE into metals and the subsequent Co carburization and/or nitriding or occurs through a direct carburization and/or nitriding of the mixed oxides.

And it is also advantageous if maximally 50 vol % additional hard phase powders are added to HEH powder, and said hard phases are mixed with metal binder in powder form in an amount of 0.1 to 40 vol %, in relation to the hardmetal, and subsequently sintered to form partially or fully sintered hardmetal granules.

With the solution according to the invention, it becomes possible for the first time to specify hardmetals which have further improved mechanical properties and include a novel concept for the structural composition of the hardmetals. It is likewise possible for the first time to specify a production method for hardmetals of this type.

This is achieved with hardmetals that are at least made up of hard phases in particle form and of metal binder arranged therebetween.

These hardmetals contain at least the novel hard phase in particle form (high-entropy hard phase—HEH) with a novel structural composition and the metal binder.

As metal binders, all metal binders known for hardmetals are thereby present in the amounts of 0.1 to maximally 40 vol %, in relation to the hardmetal, known for hardmetals.

Advantageously, these are Co, Ni, Fe, Mn, Cu, Cr, Ti or mixtures thereof, such as low-carbon and high-carbon steels and high-entropy metal alloys, which are advantageously present in an amount of 5-32 vol %, in relation to the hardmetal, in the hardmetals according to the invention.

The HEHs begin to dissolve during the sintering process. As a result, these elements can also be located in a low concentration in the metal binder, similar to how this is the case with conventional hardmetals, where the Co binder contains carbon and tungsten.

It is of significance for the invention, however, that the novel high-entropy hard phase HEH in the hardmetal according to the invention, which constitutes at least 50 vol % of all hard phases, is composed of at least four metals (Me) of the 4th and/or 5th and/or 6th subgroup of the periodic table of elements (PTE) in the form of a solid solution of carbides, nitrides, carbonitrides, oxycarbides, and/or oxycarbonitrides of the metals.

A solid solution is the term for homogeneous solids which are made up of more than just one element or one compound. Multiple types of atoms are thereby randomly oriented in a crystallographic position in the crystal lattice. As a result, the crystal structure of the phase is maintained over a more or less large concentration range. Solid solutions of this type are, for example, the transition metal carbides with a cubic NaCl structure. Different metals (Ti, Zr, V, . . . ) can thereby assume the position of the cation in the structure in random orientation, and carbon can assume the position of the anion. A solid solution is also present if the position of the anion is occupied by different amounts of carbon or by carbon, nitrogen, or oxygen (even if the compound contains only one metal, for example Ti). A random orientation of this type of the respective atoms only works within certain limits, since it can be energetically more beneficial if, at certain ratios of the atoms, the transition from the random orientation to an ordered arrangement of the atoms occurs, that is, that the precipitation of a new phase takes place, or superstructures are generated. The size of the homogeneity ranges of the solid phases increases with increasing similarity of the atoms or with the quantity of the different types of atoms.

It is therefore important for the invention that four or more metals are present in the lattice in the HEHs, since this facilitates the random arrangement of the metal atoms and then leads to a reduction of dislocation movements, and thus to an increase in the hardness. It is therefore also important for the invention that the metals are present in essentially equal amounts/concentrations in the HEH, and that none of the metals is present in an excessively high amount/concentration, since in that case this effect is no longer pronounced enough, meaning that each of the metals should have an amount of less than 70 at. %, preferably of <60 at. %. For this reason, it is desirable according to the invention that the amounts/concentrations of the individual metals are essentially equal, though deviations are possible.

The solid solutions include, for example, most alloys and mixed crystals.

The 50-0 vol %, advantageously 1 to 20 vol %, of additional hard phases in the hardmetal according to the invention can be composed of one, two, or three metals of the 4th and/or 5th and/or 6th subgroup of the periodic table of elements (PTE) in the form of a solid solution of carbides, nitrides, carbonitrides, oxycarbides, and/or oxycarbonitrides of the metals.

It is advantageous if 50-100 vol %, advantageously 60-99 vol %, more advantageously 80-98 vol % of the hard phases are an HEH composed of at least four metals of the 4th and/or 5th and/or 6th subgroup of the PTE in the form of a solid solution of carbides, nitrides, carbonitrides, oxycarbides, and/or oxycarbonitrides of the metals.

It is also advantageous if, in the hardmetal according to the invention, the hard phase HEH is present such that it is composed of five, six, seven, or more metals of the 4th and/or 5th and/or 6th subgroup of the PTE in the form of a solid solution of carbides, nitrides, carbonitrides, oxycarbides, and/or oxycarbonitrides of the metals.

It is further advantageous if the hard phase comprises Ti, V, Cr, Zr, Nb, Mo, Hf, Ta, W as metals of the hard phases.

According to the invention, the respective amount x, y, and z in total of the carbon (C), nitrogen (N), and oxygen (O) in the carbides, nitrides, carbonitrides, and/or oxycarbonitrides with metals of the 4th and/or 5th and/or 6th subgroup of the PTE is in accordance with $MeC_xN_yO_z$=$0.7 \leq x+y+z \leq 1$.

Advantageously, the respective amount x, y, and z in total of the carbon (C), nitrogen (N), and oxygen (O) in the carbides, nitrides, carbonitrides, oxycarbides, and/or oxycarbonitrides of the metals with metals of the 4th and/or 5th and/or 6th subgroup of the PTE is in accordance with $MeC_xN_yO_z$=$0.9 \leq x+y+z \leq 1$, advantageously with $MeC_xN_yO_z$ where x=0-1 and/or y=0-1 and/or z=0-0.2

Also according to the invention, the respective amount of the metals of the 4th and/or 5th and/or 6th subgroup of the PTE in the HEH containing at least four metals is essentially equal, or the amount of one or more of said metals differs by maximally 20 at %.

According to the invention, it is advantageous if the amounts of the metals are present according to the following:

HEH of a number of n metals of the 4th and/or 5th and/or 6th subgroup of the PTE with n=4 to 9, wherein in the case of n=4 to 6 the amounts of the respective metals can differ according to (1/n·100)±10 at. %, advantageously ±5 at. %, more advantageously ±2 at. %, and/or in the case of n=7 to 9 the amounts of the respective metals can differ according to (1/n·100)±5 at. %, advantageously ±2 at. %, and/or the amounts of n−3 (n minus 3) of the metals can also differ by respective amounts of >10 at. %, in relation to the total metal content in the HEH, wherein the amount of one of the metals can maximally be 70 at. %, in relation to the total metal content of the HEHs. This is advantageously less than 60 at. %; even more preferable is <50 at. %.

It is furthermore advantageous if each amount of a metal differs by maximally 20 at. % from the amount which results from the equal amounts for all metals with n metals.

It is also advantageous if, in the HEH of at least four metals of the 4th and/or 5th and/or 6th subgroup of the PTE in the form of a solid solution of carbides, nitrides, carbonitrides, and/or oxycarbonitrides, the amount of the at least four metals of the 4th and/or 5th and/or 6th subgroup of the PTE in the form of carbides, nitrides, carbonitrides, and/or oxycarbonitrides is each equal.

According to the invention, these different amounts are intended so that the amount of all metals of the 4th and/or 5th and/or 6th subgroup of the PTE in the form of carbides, nitrides, carbonitrides, and/or oxycarbonitrides in the HEH is essentially equal.

According to the invention, essentially equal amounts of metals in the HEH are to be such amounts as exhibit low variations due to production-related and technically common deviations by the value of the equal amounts.

For example, with four metals of the 4th and/or 5th and/or 6th subgroup of the PTE in the form of carbides, nitrides, carbonitrides, and/or oxycarbonitrides, the amount of each of the metals of the 4th and/or 5th and/or 6th subgroup of the PTE in the form of carbides, nitrides, carbonitrides, and/or oxycarbonitrides would each be 25%; with five metals 20% each.

According to the invention, with four metals of the 4th and/or 5th and/or 6th subgroup of the PTE in the form of carbides, nitrides, carbonitrides, and/or oxycarbonitrides, the amount of a metal can thereby differ by maximally 20 at. % from the equal amount of the four metals, that is, can be 20 at. % different from the 25% amount in the HEH.

It is furthermore advantageous if, in the HEH of at least four metals of the 4th and/or 5th and/or 6th subgroup of the PTE in the form of a solid solution of carbides, nitrides, carbonitrides, and/or oxycarbonitrides, the amount of the at least four metals of the 4th and/or 5th and/or 6th subgroup of the PTE in the form of carbides, nitrides, carbonitrides, and/or oxycarbonitrides is each equal.

It is of particular importance for the invention that the HEHs have a single-phase construction and there is no, or only a very limited, dissolution of the high-entropy hard phases in the individual carbides, nitrides, or carbonitrides, and that the solid solution of the high-entropy hard phases is also maintained in the presence of different metal binders.

The solution according to the invention thus differs from the prior art at least in that, according to the invention, one HEH of at least four metals is always present in the hard phase particles or hard phase granules, and/or that the at least four metals are present as a single phase in all HEH hard phase particles or HEH hard phase granules, and/or that the hardmetals are also realized with metals in the form of a solid solution of nitrides, carbonitrides, and/or oxycarbonitrides, and/or that in the case of a construction as a nucleus/shell structure of the hard phase particles or hard phase granules only the HEHs of at least four metals in the form of a solid solution of carbides, nitrides, carbonitrides, and/or oxycarbonitrides according to the invention are present in the nucleus.

The solution according to the invention with regard to the hardmetals can also be described in a formula, with:

$$\text{hardmetal} = \text{HEH} + \text{MB}(+\text{MeH})$$

wherein:

HEH—high-entropy hard phase $(Me_1, Me_2 \ldots Me_n)$ $C_xN_yO_z = 0.7 \leq x+y+z \leq 1$ with $\Sigma_1^n Me_i = 1$ MB—metal binder MeH—metal hard phase $Me_i$—metals.

Furthermore, in the methods according to the invention for producing hardmetals, powders of at least four different metals of the 4th and/or 5th and/or 6th subgroup of the periodic table of elements (PTE) in the form of carbides, nitrides, carbonitrides, oxycarbides, and/or oxycarbonitrides are mixed and sintered to form an HEH powder or HEH granules.

The HEH powder can thereby also be produced from the reduction of oxides from metals of the 4th and/or 5th and/or 6th subgroup of the periodic table of elements (PTE) into metals and the subsequent Co carburization and/or nitriding or synthesized by a direct carburization and/or nitriding of the mixed oxides.

Maximally <50 vol % additional hard phase powders or hard phase granules are subsequently added to the HEH powders or the sintered granules of the HEH.

These hard phases are then mixed with metal binder in powder form in an amount of 0.1 to 40 vol %, in relation to the hardmetal, and subsequently sintered to form either hardmetal powder or hardmetal granules.

Furthermore, the hardmetals containing HEH can also be produced by an in situ formation of the HEHs in which the at least four powders of metals of the 4th and/or 5th and/or 6th subgroup of the PTE in the form of carbides and/or nitrides are mixed and the mixture is synthesized with metal binders in situ during the sintering to form hardmetals containing HEH.

Also, maximally 50 vol % additional hard phase powders can be added to HEH powder, and said hard phases can be mixed with metal binder in powder form in an amount of 0.1 to 40 vol %, in relation to the hardmetal, and subsequently sintered to form partially or fully sintered hardmetal granules.

The mixture of hardmetal powder or hardmetal granules can also be processed into component parts by means of shaping and then sintered.

Advantageously, pressing, extruding, injection molding, CIP (cold isostatic pressing), and/or additive shaping processes can be used as shaping methods and thermal spraying can be used to produce surface structures.

In the shaping, binders are advantageously added to the mixture and component parts are formed therefrom. The binders are subsequently removed, and the component parts can be sintered.

The sintering can advantageously occur in a pressure-free or pressure-assisted manner by means of sinter hot isostatic pressing, hot isostatic pressing (HIP), hot pressing, or SPS.

Advantageously, at least five or six or seven or more powders of metals of the 4th and/or 5th and/or 6th subgroup of the PTE in the form of carbides, nitrides, carbonitrides, oxycarbides, and/or oxycarbonitrides are mixed and the HEHs are synthesized with metal binders in situ during the sintering.

It is particularly advantageous if the HEHs of metals the 4th and/or 5th and/or 6th subgroup of the PTE are mixed in the form of a solid solution of carbides and/or nitrides.

It is furthermore advantageous that 0 to <50 vol %, more advantageously 1 to 20 vol %, of powders from hard phases of one or two or three metals of the 4th and/or 5th and/or 6th subgroup of the PTE in the form of a solid solution of carbides, nitrides, carbonitrides, and/or oxycarbonitrides are used.

The invention is explained below in greater detail with the aid of an exemplary embodiment. The following examples show that, with the conditions chosen, the HEH phase is surprisingly stable, even if a clear reprecipitation of the HEHs occurs. The amounts of WC identified locally in the structures are caused by the prior grinding-up of the HEHs and can be avoided if processing is further improved. Similar applies to the Hf(O,C) phase found in some cases, which is caused by the incomplete reduction of the relatively stable $HfO_2$ that is present in the raw powder.

EXAMPLE 1

A single-phase high-entropy hard phase HEH having the composition $(Ta_{0.21}Nb_{0.21}Ti_{0.21}V_{0.19}W_{0.18})C$ produced from 20 at. % each of TaC, NbC, TiC, VC, and WC by means of a sintering at 1950° C. under vacuum and a subsequent comminution in a ball mill was milled with 14 vol % cobalt (HalfMicron, from UmiCore) in a ball mill in a solvent (heptane) and at a powder/grinding ball ratio of 1:20 for 48 h. Following the drying, bending fracture rods having the geometry 45×5×6 $mm^3$ were pressed from the powder by means of uniaxial pressing at 200 MPa.

The samples were sintered at 1280° C. for 45 min in a SinterHIP furnace with an HIP pressure of 10 MPa.

The sample bodies proved to be completely densified under a light microscope. The porosity according to ISO 4505 corresponded to >A02, B00, C00. The Vickers hardness was determined to be 1620 HV10, and the fracture toughness ($K_{1C}$) was calculated to be 8.5 $MPa*m^{1/2}$ by means of the measurement of the crack lengths and using the formula from Shetty (Shetty 1985—Indentation fracture of WC—Co cermets).

Results of these studies for the density, porosity, magnetic saturation, coercive field strength, hardness, and fracture toughness are provided in Table 1.

TABLE 1

| | |
|---|---|
| Density | 9.71 $g/cm^3$ |
| Porosity according to ISO xx | A00B00C00 |
| Magnetic saturation | 20.8 $\mu Tm^3 kg^{-1}$ |
| Coercive field strength | 14.3 kA/m |
| Hardness | 1620 HV10 |
| Fracture toughness (Shetty) | 8.5 $MPa*m^{1/2}$ |

After the sintering, the structure was made up of the HEC hard-phase phase, an additional WC hard-phase phase with <5 mass %, and the cobalt binder.

The amounts of the hardmetal containing HEH determined by means of quantitative X-ray analysis (Rietveld analysis) and the lattice parameter determined for the HEH are thereby provided in Tab. 2.

TABLE 2

| | |
|---|---|
| HEH lattice parameter | a = 0.43639 +− 0.00003 nm |
| Cobalt content | 6.4 +− 2.0 mass % |
| HEH content (cubic) | 91.1 +− 1.5 mass % |
| WC content | 2.4 +− 1.0 mass % |

EXAMPLE 2

The milled powder mixture described in Example 1 of the HEH hard phase having the composition $(Ta_{0.2}Nb_{0.2}Ti_{0.2}V_{0.2}W_{0.2})C$ was pressed and sintered with 16 vol % cobalt directly by means of a pressure-assisted sintering aggregate (SPS/FAST from the company FCT Systeme) at a temperature of 1200° C. and a dwell time of 3 min to form disks with a diameter of 20 mm and a height of 6 mm.

The sample bodies proved to be completely densified under a light microscope. The porosity according to ISO 4505 corresponded to >A02, B00, C00. The Vickers hardness was determined to be 1540 HV10, and the fracture toughness ($K_{1C}$) was calculated to be 10.1 $MPa*m^{1/2}$ by means of the measurement of the crack lengths and using the formula from Shetty (Shetty 1985—Indentation fracture of WC—Co cermets, see above reference).

Results of these studies for the density, porosity, magnetic saturation, coercive field strength, hardness, and fracture toughness are provided in Table 3.

TABLE 3

| | |
|---|---|
| Density | 9.68 $g/cm^3$ |
| Porosity according to ISO xx | A00B00C00 |
| Magnetic saturation | 25.2 $\mu Tm^3 kg^{-1}$ |
| Coercive field strength | 11.1 kA/m |
| Hardness | 1540 HV10 |
| Fracture toughness (Shetty) | 10.1 $MPa*m^{1/2}$ |

After the sintering, the structure was made up of the HEC hard-phase phase, an additional WC hard-phase phase with <5 mass %, and the cobalt binder enriched with W.

The amounts of the hardmetal containing HEH determined by means of X-ray analysis and the lattice parameter determined for the HEH are thereby provided in Tab. 4.

TABLE 4

| | |
|---|---|
| HEH lattice parameter | a = 0.43637 +− 0.00003 nm |
| Cobalt content | 11.5 +− 2.0 mass % |
| HEH content (cubic) | 85.5 +− 1.5 mass % |
| WC content | 3.1 +− 1.0 mass % |

EXAMPLE 3

A single-phase high-entropy hard phase having the composition $(Hf_{0.2}Ta_{0.2}Zr_{0.2}Nb_{0.2}V_{0.2})C$ produced from 20 at. % each of HfC, TaC, ZrC, NbC, and VC by means of a sintering at 1980° C. under vacuum and a subsequent comminution in a ball mill was milled with 16 vol % cobalt (HalfMicron, from UmiCore) in a ball mill in heptane and at a powder/grinding ball ratio of 1:20 for 48 h. Following the drying, the powder was pressed into bending fracture rods having the geometry 45×5×6 $mm^3$ samples by means of uniaxial pressing at 200 MPa.

The samples were sintered at 1280° C. for 45 min in a SinterHIP furnace with an HIP pressure of 10 MPa.

The sample bodies proved to be completely densified under a light microscope. The porosity according to ISO 4505 corresponded to >A02, B00, C00. The Vickers hardness was determined to be 1520 HV10, and the fracture toughness ($K_{1C}$) was calculated to be 8.9 MPa*m$^{1/2}$ by means of the measurement of the crack lengths and using the formula from Shetty (Shetty 1985—Indentation fracture of WC—Co cermets, see above reference).

Results of these studies for the density, porosity, magnetic saturation, coercive field strength, hardness, and fracture toughness are provided in Table 5.

TABLE 5

| | |
|---|---|
| Density | 9.21 g/cm$^3$ |
| Porosity according to ISO xx | A00B00C00 |
| Magnetic saturation | 21.9 µTm$^3$kg$^{-1}$ |
| Coercive field strength | 13.3 kA/m |
| Hardness | 1520 HV10 |
| Fracture toughness (Shetty) | 8.9 MPa*m$^{1/2}$ |

After the sintering, the structure was made up of the HEC hard-phase phase, an additional (Hf, Ta)C hard-phase phase with <2 mass %, and the cobalt binder.

EXAMPLE 4

A single-phase high-entropy hard phase having the composition $(Hf_{0.2}Ta_{0.2}Zr_{0.2}Nb_{0.2}Ti_{0.2})C_{0.84}N_{0.14}$ produced from 20 at. % each of HfC, TaC, ZrC, NbC, and TiC$_{0.3}$N$_{0.7}$ by means of a sintering at 2000° C. under nitrogen and a subsequent comminution in a ball mill was milled with 8 vol % cobalt (HalfMicron, from UmiCore) and 8 vol % nickel (2800, from EuroTungsten) in a ball mill in heptane and at a powder/grinding ball ratio of 1:20 for 48 h. Following the drying, bending fracture rods having the geometry 45×5×6 mm$^3$ samples were pressed from the powder by means of uniaxial pressing at 200 MPa.

The sample bodies proved to be completely densified under a light microscope. The porosity according to ISO 4505 corresponded to >A04, B00, C00. The Vickers hardness was determined to be 1720 HV10, and the fracture toughness ($K_{1C}$) was calculated to be 7.7 MPa*m$^{1/2}$ by means of the measurement of the crack lengths and using the formula from Shetty (Shetty 1985—Indentation fracture of WC—Co cermets, see above reference).

Results of these studies for the density, porosity, magnetic saturation, coercive field strength, hardness, and fracture toughness are provided in Table 6.

TABLE 6

| | |
|---|---|
| Density | 9.24 g/cm$^3$ |
| Porosity according to ISO xx | A02B00C00 |
| Magnetic saturation | 19.1 µTm$^3$kg$^{-1}$ |
| Coercive field strength | 9.3 kA/m |
| Hardness | 1720 HV10 |
| Fracture toughness (Shetty) | 7.7 MPa*m$^{1/2}$ |

EXAMPLE 5

A single-phase high-entropy hard phase HEH having the composition $(Hf_{0.25}Ta_{0.25}Zr_{0.25}Nb_{0.25})C_{0.975}O_{0.025}$ produced from 25 at. % each of HfC$_{0.9}$O$_{0.1}$, TaC, ZrC, and NbC by means of a sintering at 2000° C. under vacuum and a subsequent comminution in a ball mill was milled with 16 vol % cobalt (HalfMicron, from UmiCore) in a ball mill in a solvent (heptane) and at a powder/grinding ball ratio of 1:20 for 48 h. Following the drying, bending fracture rods having the geometry 45×5×6 mm$^3$ were pressed from the powder by means of uniaxial pressing at 200 MPa.

The samples were sintered at 1280° C. for 60 in min a SinterHIP furnace with an HIP pressure of 10 MPa.

The sample bodies proved to be completely sealed under a light microscope. The porosity according to ISO 4505 corresponded to >A02, B00, C00. The Vickers hardness was determined to be 1420 HV10, and the fracture toughness ($K_{1C}$) was calculated to be 8.0 MPa*m$^{1/2}$ by means of the measurement of the crack lengths and using the formula from Shetty (Shetty 1985—Indentation fracture of WC—Co cermets).

Results of these studies for the density, porosity, magnetic saturation, coercive field strength, hardness, and fracture toughness are provided in Table 7.

TABLE 7

| | |
|---|---|
| Density | 10.40 g/cm$^3$ |
| Porosity according to ISO xx | A00B00C00 |
| Magnetic saturation | 21.1 µTm$^3$kg$^{-1}$ |
| Coercive field strength | 14.8 kA/m |
| Hardness | 1420 HV10 |
| Fracture toughness (Shetty) | 8.0 MPa*m$^{1/2}$ |

After the sintering, the structure was made up of the HEC hard-phase phase, additional hard-phase phases containing Hf—Ta (in the form of an oxycarbide) with <5 mass %, and the cobalt binder.

The invention claimed is:

1. Hardmetals at least made up of hard phases in particle form and metal binder arranged therebetween, wherein a high-entropy hard phase (HEH), the content of which in the hardmetal according to the invention is at least 50 vol %, is composed of at least four metals (Me) of the 4th and/or 5th and/or 6th subgroup of the periodic table of elements (PTE) in the form of a solid solution of carbides, nitrides, carbonitrides, oxycarbides, and/or oxycarbonitrides of the metals, and wherein the respective amount x, y, and z in total of the carbon (C), nitrogen (N), and oxygen (O) in the carbides, nitrides, carbonitrides, oxycarbides, and/or oxycarbonitrides of the metals of the 4th and/or 5th and/or 6th subgroup of the PTE is in accordance with MeC$_x$N$_y$O$_z$ satisfies 0.7≤x+y+z≤1, and wherein the respective amounts of the metals of the 4th and/or 5th and/or 6th subgroup of the PTE in the at least four metals in the HEH are essentially equal or the amount of one or more of said metals differs therefrom by maximally 20 at. %, and wherein the carbides, nitrides, carbonitrides, oxycarbides, and/or oxycarbonitrides of the metals of the 4th and/or 5th and/or 6th subgroup of the PTE are present in each hard phase particle as a solid solution, and furthermore maximally 50 vol % of the hard phases have a different hard phase composition, and wherein all metal binders are present in the amounts of 0.1 to 40 vol %.

2. The hardmetals according to claim 1, in which 50-100 vol % of the hard phases are an HEH of at least four metals of the 4th and/or 5th and/or 6th subgroup of the PTE in the form of a solid solution of carbides, nitrides, carbonitrides, oxycarbides, and/or oxycarbonitrides.

3. The hardmetals according to claim 1, in which 0-50 vol % of the hard phases in the hardmetal are composed of one, two, or three metals of the 4th and/or 5th and/or 6th subgroup of the periodic table of elements (PTE) in the form of a solid solution of carbides, nitrides, carbonitrides, oxycarbides, and/or oxycarbonitrides of the metals.

4. The hardmetals according to claim 1, in which the hard phases are composed of carbides or nitrides of the metals of the 4th and/or 5th and/or 6th subgroup of the PTE.

5. The hardmetals according to claim 1, in which the respective amounts of x, y, and z in total of the carbon (C), nitrogen (N), and oxygen (O) in the carbides, nitrides, carbonitrides, oxycarbides, and/or oxycarbonitrides with metals of the 4th and/or 5th and/or 6th subgroup of the PTE is in accordance with $MeC_xN_yO_z$ satisfies $0.9 \leq x+y+z \leq 1$.

6. The hardmetals according to claim 1, in which the amounts of the metals are present according to the following:
   HEH has a number of n metals of the 4th and/or 5th and/or 6th subgroup of the PTE with n=4 to 9,
   wherein
   in the case of n=4 to 6 the amounts of the respective metals can differ according to (1/n 100)±1.0 at. %, and/or
   in the case of n=7 to 9 the amounts of the respective metals can differ according to (1/n 100)±5 at. %, and/or
   the amounts of n−3 (n minus 3) of the metals can also differ by respective amounts of >10 at. %, in relation to the total metal content in the HEH, wherein the amount of one of the metals can maximally be 70 at. % in relation to the total metal content of the HEH.

7. The hardmetals according to claim 1, in which each amount of a metal differs by maximally 20 at. %.

8. The hardmetals according to claim 1, in which the hard phase HEH is present such that it is composed of five or more metals of the 4th and/or 5th and/or 6th subgroup of the PTE in the form of a solid solution of carbides, nitrides, carbonitrides, oxycarbides, and/or oxycarbonitrides.

9. The hardmetals according to claim 1, in which, in the HEH of at least four metals of the 4th and/or 5th and/or 6th subgroup of the PTE in the form of a solid solution of carbides, nitrides, carbonitrides, and/or oxycarbonitrides, the amount of each of the at least four metals is essentially equal.

10. The hardmetals according to claim 1, in which metals of hard phases are selected from a group consisting of Ti, V, Cr, Zr, Nb, Mo, Hf, Ta, and W.

11. The hardmetals according to claim 1, in which the metal binders are any of Co, Ni, Fe, Mn, Cu, Cr, Ti, or mixtures thereof.

12. The hardmetals according to claim 1, in which 5 to 32 vol % metal binder is contained in the hardmetals.

13. The hardmetals according to claim 1, wherein:
   the metal binders are Co, Ni, Fe, Mn, Cu, Cr, Ti, or mixtures thereof in the form of low-carbon or high-carbon steels or high-entropy metal alloys.

14. The hardmetals according to claim 1, in which 80-98 vol % of the hard phases are an HEH of at least four metals of the 4th and/or 5th and/or 6th subgroup of the PTE in the form of a solid solution of carbides, nitrides, carbonitrides, oxy carbides, and/or oxycarbonitrides.

15. The hardmetals according to claim 1, in which the hard phase HEH is present such that it is composed of six or more metals of the 4th and/or 5th and/or 6th subgroup of the PTE in the form of a solid solution of carbides, nitrides, carbonitrides, oxycarbides, and/or oxycarbonitrides.

16. A method for producing hardmetals comprising:
   mixing and synthesizing powders from at least four metals of the 4th and/or 5th and/or 6th subgroup of the periodic table of elements (PTE) in the form of carbides, nitrides, carbonitrides, and/or oxycarbonitrides into an HEH powder or into HEH granules;
   adding maximally 50 vol % additional hard phase powders or hard phase granules to the HEH powder or the granules of the HEH;
   mixing the hard phase powders or hard phase granules with metal binder in powder form in an amount of 0.1 to 40 vol %; and
   sintering hardmetal powder or hardmetal granules, and after shaping the hardmetal powder or hardmetal granules to form shaped component parts, and after forming shaped component parts, sintering the shaped component parts.

17. The method according to claim 16, wherein: in the shaping, the component parts are shaped from the mixture with organic binders, the organic binders are then removed, and then the shaped component parts are sintered.

18. The method according to claim 16, wherein:
   the shaping is performed by pressing, extruding, injection molding, CIP (cold isostatic pressing), and/or by additive shaping.

19. The method according to claim 16, wherein:
   the sintering occurs in a pressure-free or pressure-assisted manner by means of sinter hot isostatic pressing, hot isostatic pressing (HIP), hot pressing, or SPS.

20. The method according to claim 16, wherein:
   at least five or six or seven powders of metals of the 4th and/or 5th and/or 6th subgroup of the PTE in the form of carbides, nitrides, carbonitrides, and/or oxycarbonitrides are mixed and the mixture is synthesized with metal binders in situ during the sintering to form hardmetals containing HEH.

21. The method according to claim 16, wherein:
   four powders of metals of the 4th and/or 5th and/or 6th subgroup of the PTE in the form of carbides and/or nitrides are mixed and the mixture is synthesized with metal binders in situ during the sintering to form hardmetals containing HEH.

22. The method according to claim 16, wherein:
   0 to <50 vol % of powders from hard phases of one or two or three metals of the 4th and/or 5th and/or 6th subgroup of the PTE in the form of a solid solution of carbides, nitrides, carbonitrides, and/or oxycarbonitrides are used.

23. The method according to claim 16, wherein:
   the synthesis of the HEH powder is carried out from the reduction of oxides of metals of the 4th and/or 5th and/or 6th subgroup of the PTE into metals and a subsequent Co carburization and/or nitriding or the synthesis of the HEH powder occurs through a direct carburization and/or nitriding of mixed oxides.

24. The method according to claim 16, wherein:
   maximally 50 vol % additional hard phase powders are added to HEH powder, and the hard phase powders or hard phase granules are mixed with metal binder in powder form in an amount of 0.1 to 40 vol %, in relation to the hardmetal, and subsequently sintered to form partially or fully sintered hardmetal granules.

* * * * *